United States Patent [19]

Yarbrough

[11] 4,243,982
[45] Jan. 6, 1981

[54] CURRENT MONITOR

[76] Inventor: John K. Yarbrough, Rte. 2, Box 79, Indianola, Miss. 38751

[21] Appl. No.: 15,432

[22] Filed: Feb. 26, 1979

[51] Int. Cl.³ .......................................... H02H 3/10
[52] U.S. Cl. ..................................... 340/664; 361/86
[58] Field of Search ............... 340/660, 661, 662, 664; 361/86, 87, 91, 100; 324/119, 120, 127

[56] References Cited

U.S. PATENT DOCUMENTS

| 3,249,929 | 5/1966 | Sillens, Sr. | 340/664 |
|---|---|---|---|
| 3,531,689 | 9/1970 | Horn | 361/86 |
| 3,544,844 | 12/1970 | Pellegrino | 340/664 |
| 3,654,515 | 4/1972 | Kato et al. | 340/664 |
| 3,816,816 | 6/1974 | Schweitzer | 340/664 |
| 3,843,907 | 10/1974 | Genuit et al. | 361/87 |
| 3,875,464 | 4/1975 | Gary et al. | 340/664 |
| 3,883,782 | 5/1975 | Beckwith | 361/100 |
| 3,906,309 | 9/1975 | Sullivan | 361/86 |
| 4,096,539 | 6/1978 | Scaturo | 361/87 |

FOREIGN PATENT DOCUMENTS 507191  9/1930  Fed. Rep. of Germany ...... 340/253 R

Primary Examiner—Gerald L. Brigance
Attorney, Agent, or Firm—Cushman, Darby & Cushman

[57] ABSTRACT

An A. C. current monitor for the protection of such devices as appliances and machine tools with a high Q transformer whose primary winding is series connected to the load line being monitored. The transformer is coupled to an audible alarm by a half wave rectifier filter and a solid state bilateral switch. By suitable choice of RC constant of the filter, a "chirping" response is obtained for load line currents marginally above a predetermined value in order to indicate the amount of overcurrent in the load line. In the preferred embodiment, a circuit breaker in the load line may also be coupled to the bilateral switch through a delay pull-in relay.

5 Claims, 1 Drawing Figure

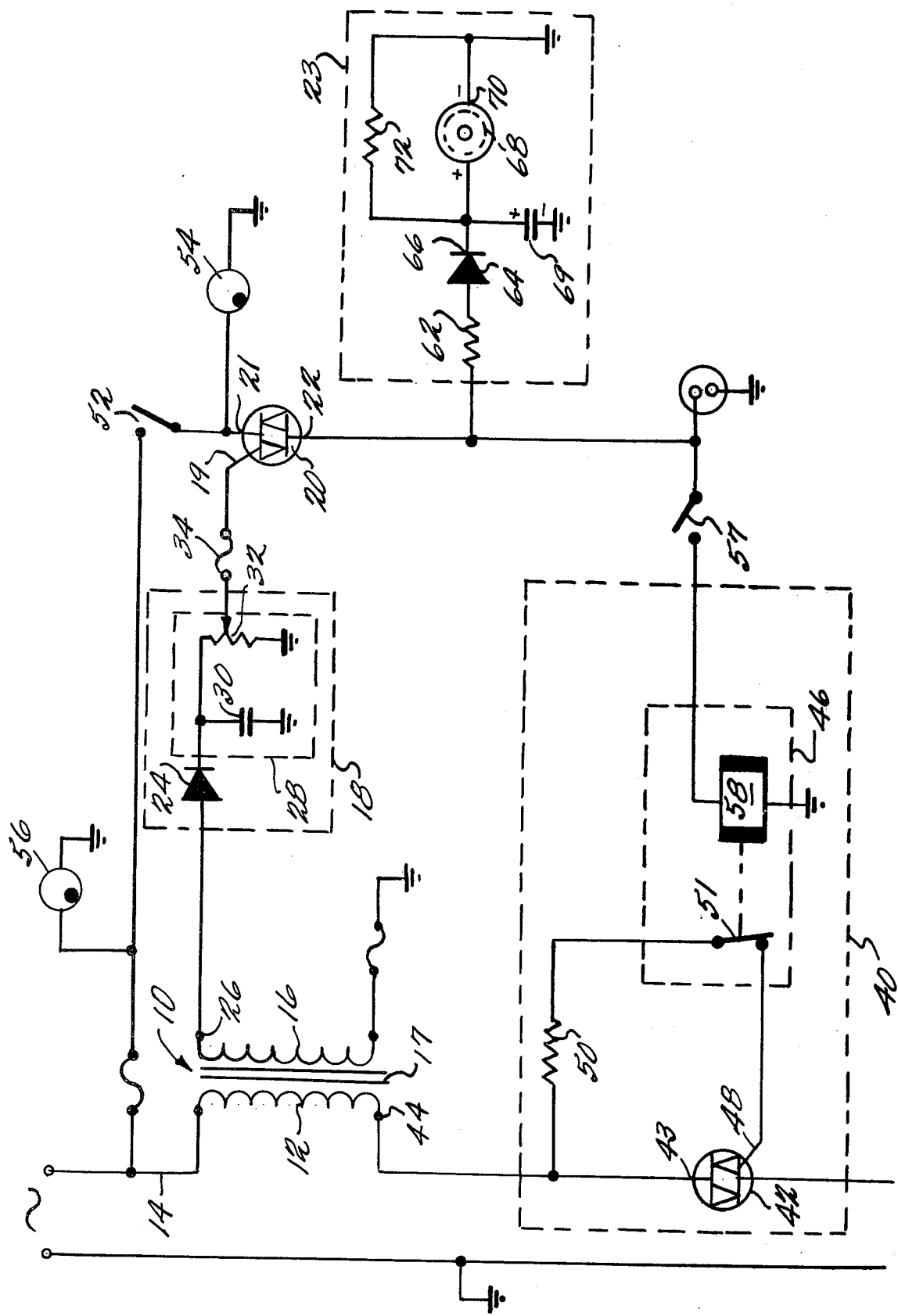

CURRENT MONITOR

BACKGROUND OF THE INVENTION

The invention relates to A. C. current monitors and more particularly to an electronic device which senses the amount of current in an A. C. load line and causes a fault signal to be developed when the current exceeds a predetermined magnitude.

Many electrical devices such as appliances and machine tools may be damaged or will not operate properly in the presence of high currents. A current monitor may serve to protect such devices by developing a fault signal when the current exceeds a predetermined safe value. In order to serve this function in a reliable, inexpensive and economical manner, such a current monitor should be simple and economical in construction and develop very low voltages during operation.

Current monitors of the prior art do not satisfy these criteria. U.S. Pat. No. 3,916,309 to Faulkes et al discloses a current monitor which is directed primarily to engineering measurement usage rather than protecting electrical devices in use and measures only the short circuit current capacity, not the current in the load line. U.S. Pat. No. 3,934,239 to Mason et al discloses a complex current monitoring device utilizing four windings, two magnetic cores and means for obtaining two regulated D. C. voltages to be applied to operational amplifiers and additional complex circuitry for calibration.

The present invention overcomes these and other disadvantages of the prior art current monitors by providing an A. C. current monitor having solid state components and a single high Q transformer which develops an audible alarm signal when the current in the load line equals or exceeds a predetermined magnitude. The simplicity of design is based on the series connection of the primary winding of a low reactance transformer in the load line. The secondary winding feeds a voltage proportional to the current in the load line to a rectifier and filter circuit which in turn feeds a D. C. voltage proportional to the amplitude of the load line current to the gate of a bidirectional switch such as a triac. The filter circuit contains a potentiometer which may be calibrated to close the switch when the load line current equals or exceeds a predetermined value. When the switch is closed an audible alarm is actuated by an A. C. power source such as the load line being monitored. Optionally, the bidirectional switch may also be connected to a load line circuit breaker such as a second bilateral switch in the load line whose gate is coupled to the first switch through a delay pull-in relay. In addition or as an alternative to an audible alarm, a paging system, visual alarm, remote telephone dialing system or other alarm mechanism may be activated by the fault system.

By using a series primary winding having very low reactance, and solid state components in the sensing circuitry, the device will be very sensitive while a very low voltage drop is maintained in the primary winding and relatively low voltages maintained in the sensing circuitry, thereby protecting sensitive circuit elements and keeping energy dissipation at a low level. For example, with the sensor circuitry developing A. C. voltages of two to three volts and D. C. voltages of zero to four volts the device will monitor currents of seven to twenty amperes. Much larger or smaller load currents may also be monitored using these same principles of the invention. By using a high Q core which is, in combination with the primary and secondary windings, designed to saturate abruptly when the maximum load line current to be monitored is present, the remainder of the circuit is protected against voltage spikes and resulting damage in response to current surges in the primary.

Another feature of the invention is that the rectifier filter circuitry does not provide a pure D. C. signal but a signal having an A. C. component so that the gate is turned on and off intermittently (at the line frequency) when the amplitude of the load line current only marginally exceeds the predetermined current value at which the bilateral switch is designed to close. This opening and closing of the bilateral switch causes a chirping sound which indicates to the listener the degree of overcurrent present in the load line.

Other objects, features and advantages of the present invention will be obvious from the following description when taken in conjunction with the illustrative embodiment of the accompanying drawing which shows a circuit diagram of the preferred embodiment of the invention.

DETAILED DESCRIPTION OF THE PREFERRED EMBODIMENT

In accordance with the preferred embodiment of the invention as illustrated by the figure, there is provided a transformer 10 having a primary winding 12 adapted to be series connected in a load line 14, a secondary winding 16 and a magnetic core 17. Transformer 10 has a very high Q and negligible reluctance. Windings 12 and 16 should have negligible reluctance and core 17, suitably composed of powdered iron, should have a high permeability. Transformer 10 is designed so that for the current values of concern in primary winding 12 a voltage is developed across secondary winding 16 which is directly proportional to the current in primary winding 12. Across secondary winding 16 is connected a rectifier filter circuit which develops a D. C. voltage proportional to the magnitude of the voltage across the secondary winding 16. The rectifier filter circuit is suitably a half wave rectifier filter circuit 18 which provides a D. C. voltage proportional to the secondary voltage at the gate 19 of a solid state bilateral switch, suitably triac 20. Triac 20 has its input terminal 21 connected to an A. C. power source, suitably load line 14, and an identical output terminal 22, to an alarm circuit, suitably audible alarm circuit 23. Half wave rectifier filter 18 suitably includes diode 24 which receives the secondary voltage signal from secondary winding terminal 26. The rectified signal is then filtered by an RC filter 28 suitably consisting of parallel connected electrolytic capacitor 30 and potentiometer 32. The wiper 33 of potentiometer 32 is connected through a fuse 34 to the gate 19 of triac 20. The wiper 33 of potentiometer 32 is calibrated so that triac 20 will be turned on when the current through transformer primary winding 12 reaches the predetermined current value. It will be noted that the voltage developed at triac gate 19 will generally not be a pure D. C. voltage but will have an A. C. component whose amplitude depends primarily on the relative values of the RC time constant of the filter 28 and the load line current frequency, the relation being well known to those skilled in the art. Consequently, as the peak amplitude of the current in the primary winding 12 reaches the predetermined current magnitude the triac 20 will be caused to turn on and off at the frequency of the A. C. current until the peak A. C. current exceeds the predetermined current magnitude by some finite amount which depends upon the R. C. time constant of filter 28, the current frequency, and the selected load current at which the circuit is designed to triac switch 20. By choosing suitable values of capacitor 30 and potentiometer 32 in a manner well known to those skilled in the art, the alarm may be caused to "chirp" in some range of primary current values which marginally exceed the predetermined current magnitude, thereby providing some advanced warning that the current is becoming excessive. Suitably, capacitor 30 and potentiometer 32 are chosen so that the A. C. component of the voltage is 5% of the D. C. component.

In accordance with the preferred embodiment of the invention circuit breaker means are also provided so that the load line 14 may be opened in response to the same overcurrent as causes the alarm 23 to be energized. Circuit breaker 40 suitably includes a second solid state bidirectional switch, typically triac 42, connected at main terminal 43 to one end 44 of primary winding 12, and relay means, suitably delay pull-in relay 46 coupling gate 48 of triac 42 to first triac terminal 22. Pull-in relay includes stationary contact 51 and coil 58. A resistor 50 is connected between triac terminal 43 and gate 48 through the stationary contact 51 of relay 46 so that when triac 20 is turned on via switch 57, relay 46 will be activated to open circuit second triac gate 48 so as to open circuit the load line current. The relay may be disabled by manually opening switch 57.

If other visual, audible or other alarm means are desired, they may be conveniently connected to first triac 22 terminal.

In order that the alarm 23 may be manually disabled an enable/disable switch 52 is suitably disposed between load line 14 and main triac main terminal 21. A status indicator light, suitably neon light 54 is connected between triac main terminal 21 and ground. A power indicator, suitably neon light 56 is disposed between the load line side of alarm enable/disable switch 52 and ground.

Audible alarm circuit 23 is suitably composed of current limiting resistor 62 series connected to a diode 64, the cathode terminal of which 66 is connected to the positive terminal of audio transducer 68. Cathode 66 is also connected to ground through timing capacitor 69 and to the grounded terminal 70 of transducer 68 through timing resistor 72.

It will be understood that the present description is of an illustrative embodiment of the present invention and the invention is not limited to the specific form shown. For example, any alarm means which meets the user's particular needs may be utilized. These and other modifications can be made in the design and arrangement of the elements as will be apparent to those skilled in the art, without departing from the scope of the invention expressed in the appended claims.

What is claimed is:

1. An A. C. current monitor having solid state components which develops an alarm signal when the A. C. current in a load line equals or exceeds a predetermined A. C. current magnitude, said current monitor comprising:

a high Q transformer having a primary winding adapted to be series connected in a load line, a secondary winding and a magnetic core, said secondary winding being inductively coupled to said primary so as to develop a voltage across said secondary winding which is directly proportional to the current through said primary winding;

a triac switch including a gate and two main terminals, said triac switch being automatically turned on and off by a voltage applied at said gate, said switch being automatically turned on when the magnitude of said voltage exceeds a predetermined value, said switch being automatically turned off when the magnitude of said voltage is less than said predetermined value;

means for developing a gate voltage, said gate voltage including a D. C. component proportional to the magnitude of said secondary voltage, said D. C. component being less than said predetermined voltage value by a predetermined voltage amount when the magnitude of said A. C. current equals said predetermined A. C. current magnitude, said gate voltage being applied at said gate;

first rectifier means for rectifying the current through said switch; and alarm means, series connected to said triac switch at one of said main terminals and responsive to the rectified current through said switch, for emitting an audible alarm;

said voltage developing means including second rectifier means for rectifying said secondary voltage, resistor means and capacitor means;

said resistor means and said capacitor means together forming RC network means for periodically and automatically turning said switching means on and off so that said alarm means emits a chirping sound at a rate equal to the rate of said turning on and off when the magnitude of the difference between the magnitude of said A. C. current and said predetermined A. C. current magnitude is less than a predetermined current amount, the frequency of said chirping varying with the value of said difference so as to indicate the amount of overload in the load line.

2. Current monitor as in claim 1 wherein said resistor means comprises:

variable resistor means for calibrating said triac switch so that said triac switch is turned on when said current equals or exceeds said predetermined current value;

said variable resistor means and said capacitor means together forming RC network means for periodically and automatically turning said first switch on and off when the magnitude of the difference between the magnitude of said A. C. current and said predetermined A. C. current magnitude is less than said predetermined current amount.

3. Current monitor as in claim 1 further comprising circuit breaker means for interrupting said current in said load line.

4. Current monitor as in claim 3 wherein said circuit breaker means includes:

a second triac switch having a pair of main terminals and a gate, one of said terminals being connected to one end of said primary winding; and relay means for connecting said second switch gate to said first switch so that said load line is interrupted when said first switch is turned on.

5. Current monitor as in claim 1 wherein said D. C. voltage developing means includes a half wave rectifier series connected to a passive filter having an RC time constant, the output of said filter being coupled to said first switch gate.

* * * * *